US010507504B2

(12) United States Patent
Yamamoto et al.

(10) Patent No.: US 10,507,504 B2
(45) Date of Patent: Dec. 17, 2019

(54) HYBRID EXTRUSION PRESS

(71) Applicant: UBE MACHINERY CORPORATION, LTD., Ube, Yamaguchi (JP)

(72) Inventors: Takeharu Yamamoto, Yamaguchi (JP); Yoshitaka Moroi, Yamaguchi (JP)

(73) Assignee: Ube Machinery Corporation, Ltd., Yamaguchi (JP)

( * ) Notice: Subject to any disclaimer, the term of this patent is extended or adjusted under 35 U.S.C. 154(b) by 191 days.

(21) Appl. No.: 15/735,274

(22) PCT Filed: Nov. 16, 2015

(86) PCT No.: PCT/JP2015/082140
§ 371 (c)(1),
(2) Date: Dec. 11, 2017

(87) PCT Pub. No.: WO2016/199324
PCT Pub. Date: Dec. 15, 2016

(65) Prior Publication Data
US 2018/0185895 A1    Jul. 5, 2018

(30) Foreign Application Priority Data

Jun. 12, 2015    (WO) .................. PCT/JP2015/067078

(51) Int. Cl.
*B21C 23/21*    (2006.01)
*B30B 11/26*    (2006.01)
(Continued)

(52) U.S. Cl.
CPC .......... *B21C 23/211* (2013.01); *B29C 48/252* (2019.02); *B30B 11/22* (2013.01); *B30B 11/26* (2013.01)

(58) Field of Classification Search
CPC ....... B21C 23/00; B21C 23/21; B21C 23/211; B21C 23/212; B21C 23/215;
(Continued)

(56) References Cited

U.S. PATENT DOCUMENTS 4,345,450 A     8/1982 Doudet
7,591,163 B2 *  9/2009 Yamamoto .............. B21C 23/04
                                                    72/272

(Continued)

FOREIGN PATENT DOCUMENTS

JP          53-60858 A     5/1978
JP        2010-179332 A    8/2010
(Continued)

*Primary Examiner* — Pradeep C Battula
(74) *Attorney, Agent, or Firm* — DLA Piper LLP (US)

(57) ABSTRACT

A hybrid extrusion press is provided with electric motors and hydraulic assist cylinders to cause a container holder to slide, wherein connecting rods are fastened to a container holder, the hydraulic assist cylinders have piston rods and gate devices connecting or disconnecting the connecting rods and the piston rods, and the gate devices are provided with hollow members fastened to the piston rods, enlarged diameter parts provided at single ends of the connecting rods and moving back and forth inside hollow parts of the hollow members, and locking parts provided at the hollow members and locking the enlarged diameter parts.

5 Claims, 13 Drawing Sheets

(51) Int. Cl.
   *B29C 48/25* (2019.01)
   *B30B 11/22* (2006.01)
(58) Field of Classification Search
   CPC ..... B21C 23/217; B21C 23/218; B21C 25/02;
                                  B30B 11/22; B30B 11/26
   See application file for complete search history.

(56) References Cited

U.S. PATENT DOCUMENTS

| | | | | |
|---|---|---|---|---|
| 8,490,453 | B2* | 7/2013 | Yamamoto | B21C 23/21 |
| | | | | 72/254 |
| 9,114,447 | B2* | 8/2015 | Yamamoto | B21C 23/211 |
| 9,302,304 | B2* | 4/2016 | Yamamoto | B21C 23/21 |
| 9,707,606 | B2* | 7/2017 | Yamamoto | B21C 23/211 |
| 10,307,807 | B2* | 6/2019 | Yamamoto | B21C 23/21 |
| 2002/0088601 | A1* | 7/2002 | Hung | B21C 23/21 |
| | | | | 164/312 |
| 2007/0227221 | A1* | 10/2007 | Yamamoto | B21C 23/04 |
| | | | | 72/271 |
| 2010/0000283 | A1 | 1/2010 | Yamamoto et al. | |
| 2012/0244239 | A1* | 9/2012 | Yamamoto | B21C 23/211 |
| | | | | 425/258 |
| 2014/0157852 | A1* | 6/2014 | Yamamoto | B21C 27/00 |
| | | | | 72/272 |
| 2014/0216122 | A1* | 8/2014 | Yamamoto | B21C 23/21 |
| | | | | 72/21.3 |
| 2015/0040635 | A1 | 2/2015 | Frehe et al. | |
| 2015/0107324 | A1* | 4/2015 | Yamamoto | B21C 23/211 |
| | | | | 72/272 |
| 2015/0202672 | A1* | 7/2015 | Moroi | B21C 23/085 |
| | | | | 72/265 |
| 2015/0290690 | A1 | 10/2015 | Claasen et al. | |

FOREIGN PATENT DOCUMENTS

| | | |
|---|---|---|
| JP | 2011-161456 A | 8/2011 |
| JP | 2014-532564 A | 12/2014 |
| JP | 2014-533202 A | 12/2014 |
| WO | 2008/087891 A1 | 7/2008 |
| WO | WO-2014041881 A1 * | 3/2014 ........... B21C 23/085 |

* cited by examiner

HYBRID EXTRUSION PRESS

TECHNICAL FIELD

The present disclosure relates to an extrusion press for extruding a billet of aluminum or its alloy etc., more particularly relates to an extrusion press of a configuration using a drive source of a mixture of a hydraulic device type and electrical drive type and with a main crosshead and container holder freely sliding on a machine base along its axial center. The present disclosure is not limited to aluminum or its alloy and can also be applied to extrusion of other metal materials or of plastic materials.

BACKGROUND ART

"Extrusion" is a method of pressing against a starting billet placed in a hollow cylindrical container by a stem provided at a main crosshead, so as to push it through a die having a desired opening shape arranged close to one end part of the container at the extrusion side and thereby shape it into a bar material, shaped material, tube material, or various other cross-sectional shapes. The main crosshead is driven by a hydraulic main ram provided at a main housing. The die is provided at an end platen side. The end platen is connected by tie rods to an immovable main housing.

During the extrusion process, the container has to be pressed against the die by a certain fixed pressure. This is referred to as a "container seal" operation. Further, after the end of the extrusion process, to cut off and remove the discard, the container is made to retract and clearance between the container and die is secured so as to enable a shear blade to be moved up and down. This is referred to as a "container strip" operation.

A type of operation of an extrusion apparatus operating by a composite system of an electric motor and hydraulic pressure in such an extrusion process is disclosed in PLT 1. In this prior art, a billet holder (container) and ram crosshead (main crosshead) are electrically driven to move until the billet abuts against the die, then hydraulic force is made to act on a pressing ram (main ram) to start the extrusion by an extrusion plunger (stem). The billet holder is sealed against the tool set (die) by traction rods. After the end of extrusion, the pressure of the pressing ram is released, then the billet holder and ram crosshead are electrically driven to return to their retraction limits. The billet holder and ram crosshead are guided in movement by a plurality of pressing support parts.

In this prior art, the extrusion ram has a built-in clamp device, while the traction rods have built-in ring-shaped cylinder clamp units. The working force in this prior art is structured relying on the frictional force obtained by making the parts inside the clamps broader in a tapered manner. In this structure, the sliding parts inevitably become worn. Maintenance is frequently required for replacing parts. However, since the parts are formed inside the clamps, a long time required for replacement and other problems are envisioned. Further, a prefill valve is also built into the back part of the main ram. It is comprised of complicated parts, so time is required for maintenance for replacement of the parts.

CITATION LIST

Patent Literature

PLT 1: Japanese Unexamined Patent Publication No. 2014-533202A

SUMMARY

We provide a hybrid extrusion press using a mixed drive source of hydraulic pressure and electrical power to reduce energy consumption and simplify the structure of the apparatus as a whole so as to improve maintenance and reduce the maintenance time.

The hybrid extrusion press comprises a machine base, an end platen having a die, a main crosshead having an extrusion stem and sliding on the machine base, a hydraulic main ram coupled with the main crosshead, a container holder sliding on the machine base, electric motors and hydraulic assist cylinders making the container holder slide, and connecting rods are fastened to the container holder, wherein the hydraulic assist cylinders have piston rods and gate devices connecting or disconnecting the connecting rods and the piston rods, wherein the gate devices are provided with hollow members fastened to the piston rods, enlarged diameter parts provided at single ends of the connecting rods and moving back and forth inside hollow parts of the hollow members, and locking parts provided at the hollow members and locking the enlarged diameter parts.

The hydraulic assist cylinders are given the function of providing the container seal force and container strip force. At that time, these operations are performed by opening and closing gate devices equipped at the hydraulic assist cylinders. For this reason, the structure also is simple. In particular, there are no parts which become greatly worn and maintenance time can be slashed. Further, at the time of a container retraction operation after a container strip operation, the gate devices of the hydraulic assist cylinders are opened whereupon the container can be completely separated from the hydraulic assist cylinders and can be retracted by just being electrically driven. Therefore, the strokes of the hydraulic assist cylinders can be made the minimum necessary limit and can be greatly shortened compared with the conventionally required strokes. Furthermore, since the hydraulic assist cylinders can be separated by opening the gate devices, it is possible to increase the stroke of the container holder when electrically driven for maintenance and inspection without regard as to the strokes of the hydraulic assist cylinders.

By using a drive source of a mixture of a hydraulic device type and electrical drive type, it is possible to conserve energy. It is possible to improve maintenance and cut the maintenance time so as to improve the operating rate of the equipment and realize a higher productivity facility. Simultaneously, the locations where hydraulic units are used can be cut, so the risk of oil leakage is reduced, the work environment can be improved, and the machinery and equipment can be made better in operability.

DESCRIPTION OF EMBODIMENTS

Figure 1:
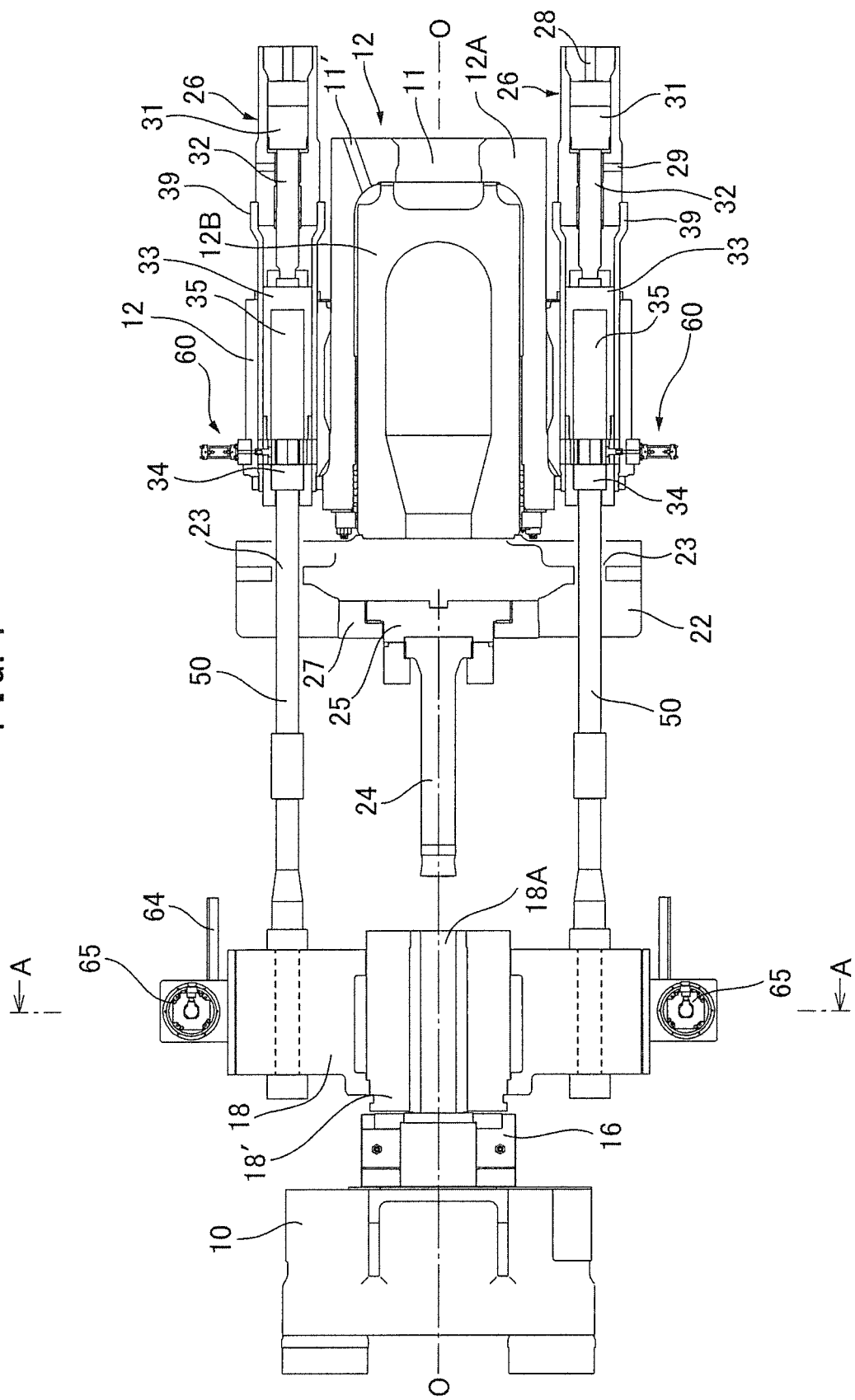
FIG. 1 is a plan view showing a first embodiment of the present disclosure.

Below, referring to the drawings, one embodiment of the present disclosure will be explained. The present disclosure is not necessarily limited to the embodiment of FIG. 1. It can be applied to all extrusion presses of a type designed to be able to move a container holder by hydraulic assist cylinders and electric motors.

First Embodiment

Figure 2:
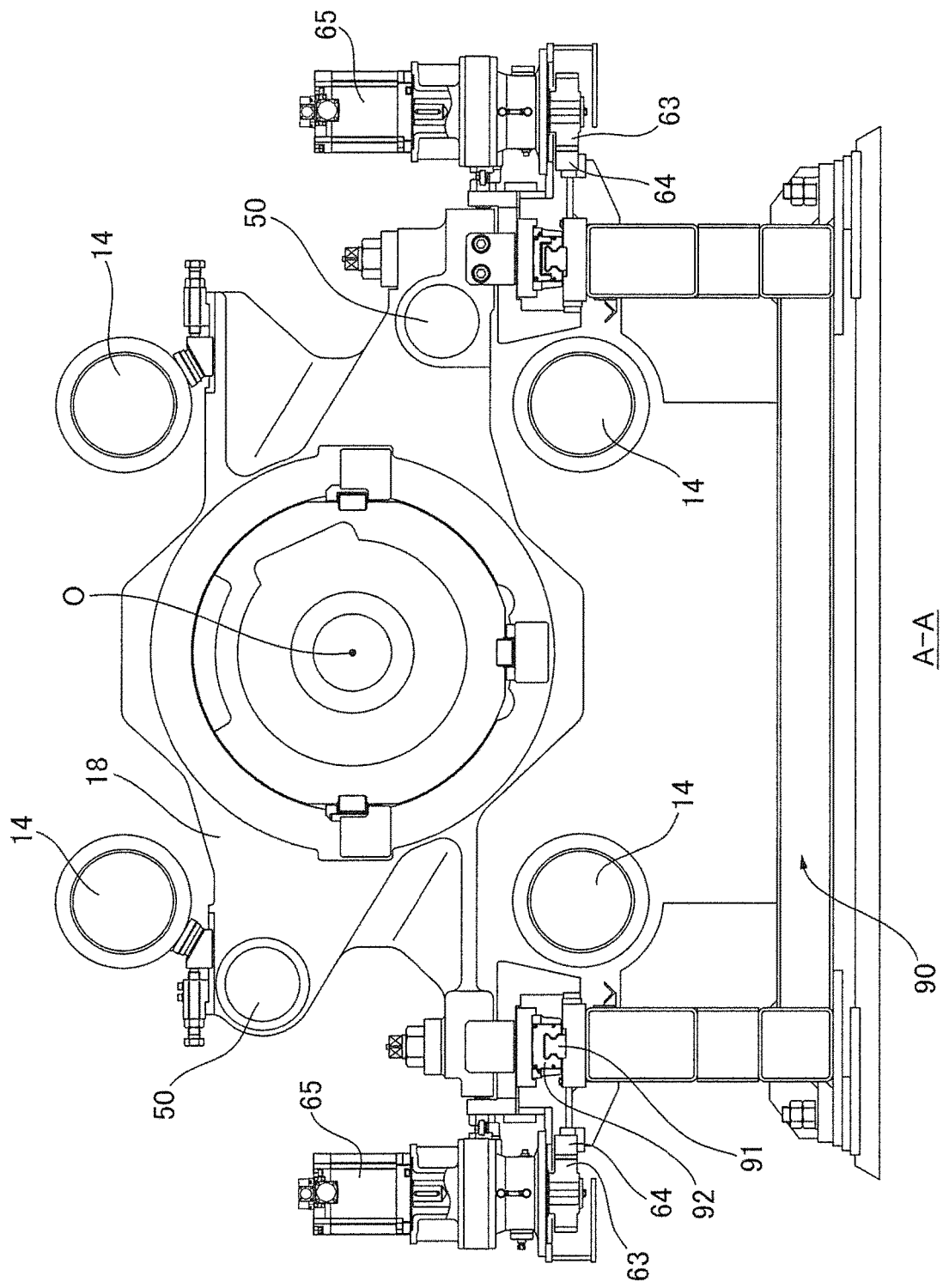
FIG. 2 is a cross-sectional view along the line A-A of FIG. 1.
Figure 3:
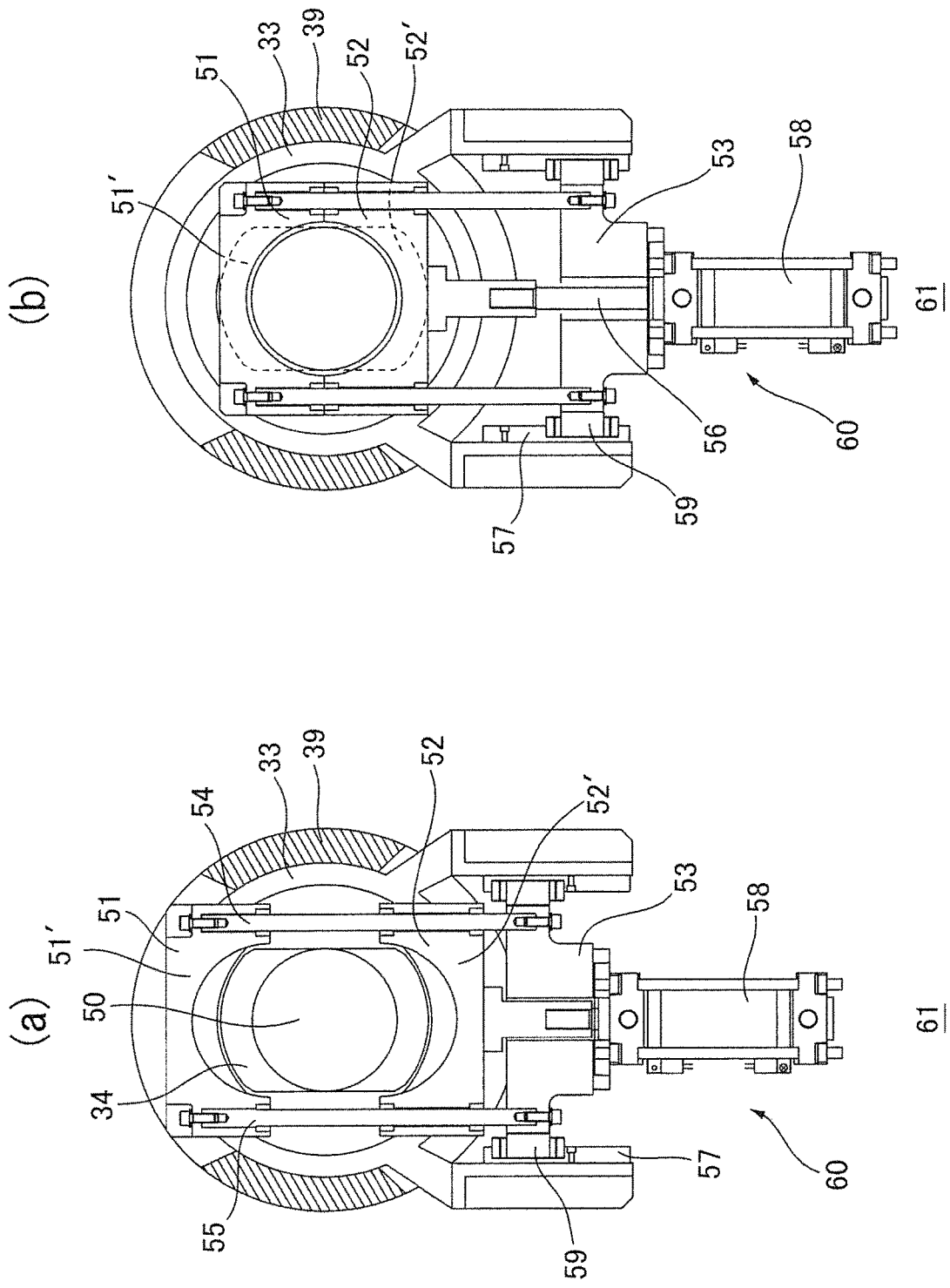
FIGS. 3(a) and (b) are cross-sectional views of a gate device, in which (a) is the gate device in the open state and (b) is the gate device in the closed state.
Figure 4:
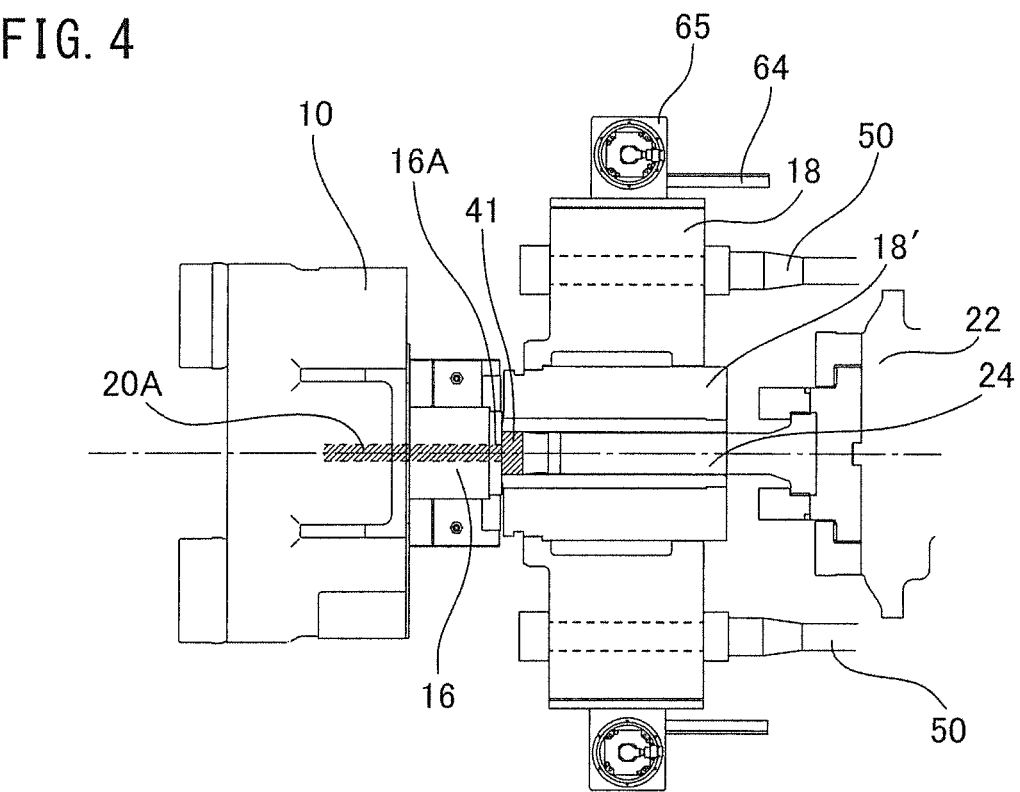
FIG. 4 is an explanatory view of the time of end of an extrusion operation of an extrusion press.
Figure 5:
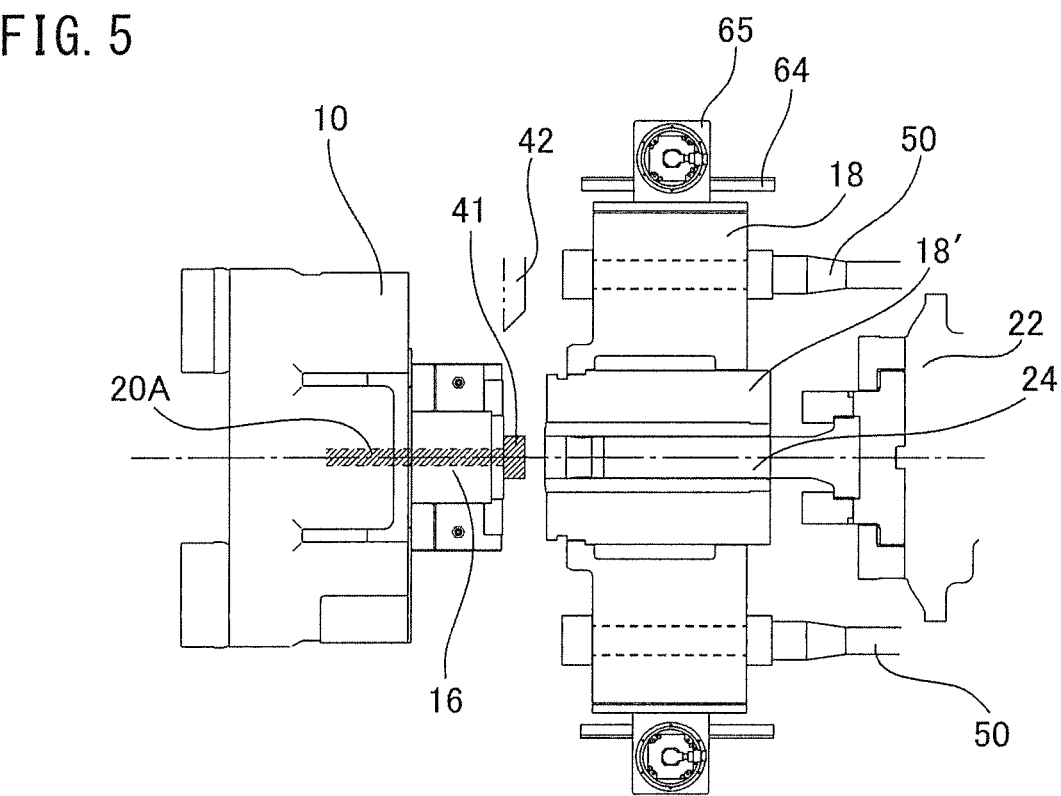
FIG. 5 is an explanatory view of the time of a container strip operation of an extrusion press.
Figure 6:
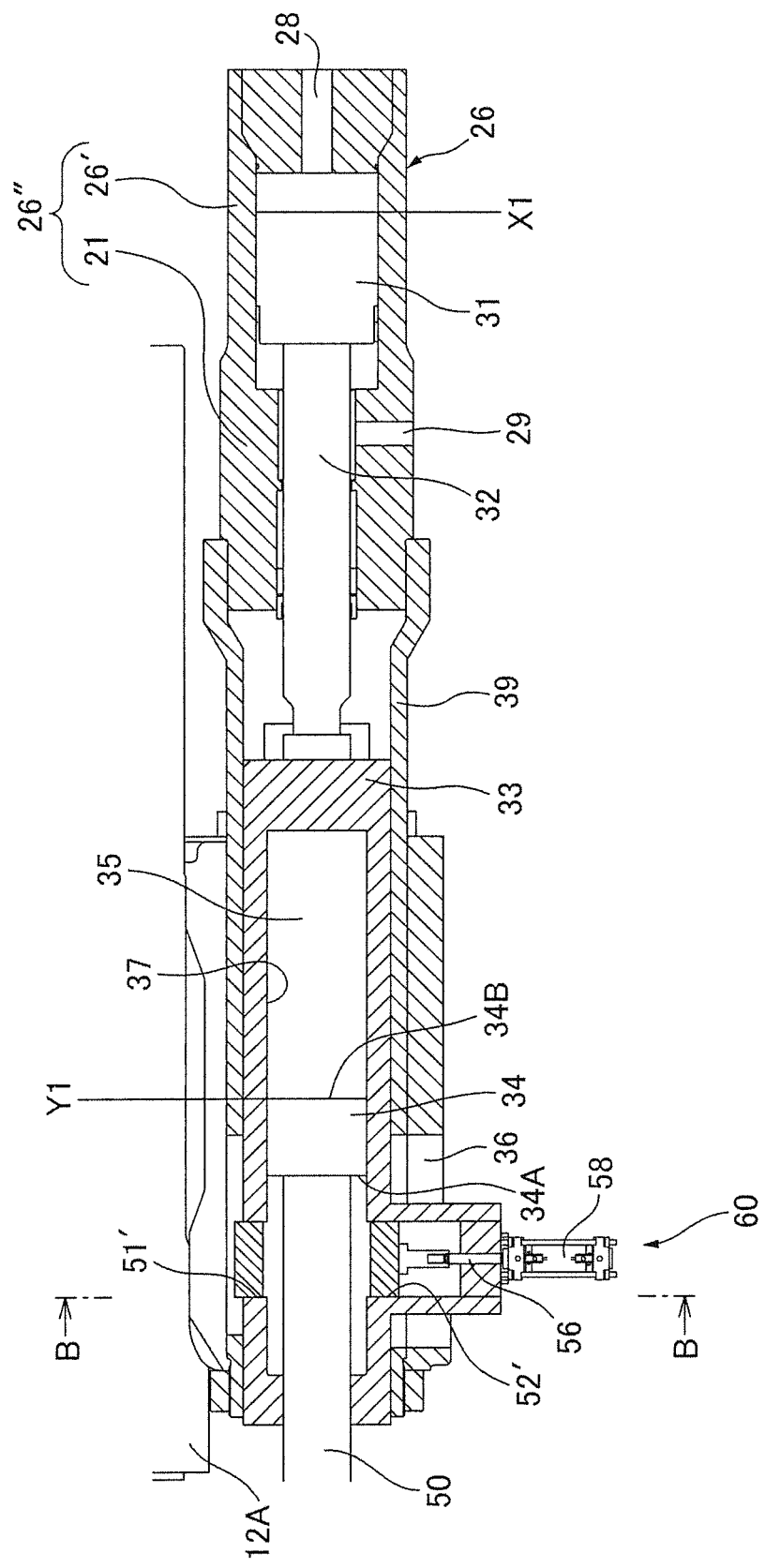
FIG. 6 is an explanatory view for explaining an operating stroke of a gate device of the first embodiment of the present disclosure.

Below, an embodiment of an extrusion press according to the present disclosure will be explained in detail with reference to the drawings. FIG. 1 is a plan view showing a first embodiment of the present disclosure. FIG. 2 is a cross-sectional view along the line A-A of FIG. 1. FIGS. 3(*a*) and (*b*) are cross-sectional views of a gate device, in which (a) is the gate device along the line B-B of FIG. 6 where the gate device is in the open state and (b) is the gate device along the line C-C of FIG. 8 where the gate device is in the closed state. FIG. 4 is an explanatory view of the time of end of an extrusion operation of an extrusion press. FIG. 5 is an explanatory view of the time of a container strip operation of an extrusion press. FIG. 6 is a cross-sectional view of a gate device in the first embodiment of the present disclosure. FIGS. 6 to 9 are explanatory views for explaining an operation of a gate device. In FIG. 1, the die 16 side seen from the container holder 18 is defined as the "front", the main cylinder housing 12 side is defined as the "back", and the vertical direction in the figure is defined as "up" and "down". The present embodiment is an embodiment of the case of rear loading a billet from a back side of the container 18'.

As shown in FIGS. 1 and 2, the extrusion press is comprised of an end platen 10 and a main cylinder housing 12 arranged facing each other. The two are connected by a plurality of tie rods 14 (here, two each at the top and bottom). At the main cylinder housing side of the end platen 10, a container 18' is arranged between the end platen 10 and a die 16 in which a die hole 16A is formed. The billet is loaded into the container 18' and is pressed toward the die 16 whereby a product with a cross-section corresponding to the die hole 16A (see FIG. 4) is extruded. The container 18' is fastened to the container holder 18.

The main cylinder housing 12 generating the extrusion force comprises a main cylinder 12A in which a hydraulic main ram 12B is housed and can press and move the hydraulic main ram 12B toward the die 16 and container 18'. At the front end part of this hydraulic main ram 12B, a main crosshead 22 is attached. At the center of this front surface part, an extrusion stem 24 is attached in a state sticking out toward the container 18' so as to be arranged concentrically (axial center O) with a billet loading opening 18A of the container 18'. The container holder 18 containing the container 18', as shown in FIG. 2, is carried on rails 91 set on a machine base 90 and slides along the axial center O via sliders 92. While not shown, the main crosshead 22 similarly is carried on the rails 91 set on the machine base 90 and slides along the axial center O via sliders. In the present embodiment, the four tie rods 14 are not used as sliding guides.

The extrusion stem 24 is a stem slide type with a base part 25 which engages with a slide groove 27 and slides up and down in FIG. 1. When loading a billet, the extrusion stem is made to rise upward and the billet is placed behind the container 18'. The billet loader inserts the billet into the billet loading opening 18A. After that, the extrusion stem 24 descends until it is coaxial with the axial center O. Not shown side cylinders are connected to the two sides of the crosshead 22. If driving the side cylinders, the extrusion stem 24 inserts the billet into the loading opening 18A of the container 18'. If driving the hydraulic main ram 12B to make the crosshead 22 advance, the crosshead presses against the rear end surface of the loaded billet and extrudes the product 20A (see FIG. 4).

At the main cylinder 12A, hydraulic assist cylinders 26 are attached to the two sides parallel to the axial center O of the extrusion press. The hydraulic assist cylinders 26 move the container holder 18 in the front-back direction together with the later explained electric motors 65. The hydraulic assist cylinders 26 operate in a container seal operation (FIG. 4), container strip operation (FIG. 5), or other case where pressing force is required, while the electric motors 65 are used for otherwise quickly moving the container holder 18 in the front-back direction. The characterizing feature of the present embodiment is that the gate devices 61 are used to lighten the loads of the electric motors 65.

The hydraulic assist cylinders 26 and the gate devices 61 will be explained next. As seen in FIGS. 1 and 6, each hydraulic assist cylinder 26 is comprised of a hydraulic cylinder in which a piston 31 and a piston rod 32 are housed and has hydraulic ports 28 and 29. At the front of a cylinder casing 26" comprised of a cylinder tube 26' and a rod cover 21, a cylindrical member 39 is connected and fastened. At the front end of the piston rod 32, a hollow member 33 is fastened. On the other hand, as shown in FIG. 1, at the container holder 18, connecting rods 50 are fastened. A back end part of each connecting rod 50 is provided with an enlarged diameter part 34. The enlarged diameter part 34 moves back and forth inside a hollow part 35 of the hollow member 33. The hollow member 33 is provided with a locking part 60 locking the enlarged diameter part 34. The enlarged diameter part 34 of the connecting rod 50 connected to the container holder 18 is locked by a first locking face 51' and a second locking face 52' of the locking part 60. The locking part 60, as explained later, is comprised of a first bracket 51, a second bracket 52, etc. The front surface of the first bracket 51 is made the first locking face 51' and contacts the rear surface of the enlarged diameter part 34. The surface of the second bracket 52 is made the second locking face 52' and contacts the rear surface of the enlarged diameter part 34. Note that, the "enlarged diameter part 34" is defined as a part larger in diameter than the connecting rod 50. In the present embodiment, as seen in FIG. 3(*a*), the enlarged diameter part 34 is not a perfect circular shaped cross-section, but has the left and right sides cut off. For this reason, when the first bracket 51 and the second bracket 52 are opened, the enlarged diameter part 34 is able to pass through them. The connecting rod 50 passes through the main crosshead 22 at the through hole 23.

Each gate device 61 is comprised of a hollow member 33 fastened to a piston rod 32, an enlarged diameter part 34 provided at one end of a connecting rod 50 and moving back and forth inside the hollow part 35 of the hollow member 33, and a locking part 60 provided at the hollow member 33 and locking the enlarged diameter part 34. The gate device 61 connects ("closes") and disconnects ("opens") the connecting rod 50 and piston rod 32. When a pressing force is required such as in a container seal operation and a container strip operation, it connects the connecting rod 50 and the piston rod 32 so that the hydraulic force of the hydraulic assist cylinder 26 is transmitted to the container holder 18. If the first locking face 51' and the second locking face 52' of the locking part 60 retract so as to disconnect the connecting rod 50 and the piston rod 32, the enlarged diameter part 34 can move freely back and forth in the hollow part 35 of the hollow member 33.

Next, the electrical drive operation of the container holder 18 will be explained. With positioning by electrical power, it is easier to raise the speed and precision compared with positioning by hydraulic pressure. As seen in FIG. 1, electric motors 65 are set in the container holder 18. As shown in FIG. 2, gears 63 controlled to be driven to rotate by electric motors 65 are engaged with racks 64 (see FIG. 1) fastened to the machine base 90 side and are designed to be able to electrically drive the container holder 18 in the axial center O direction. When electrically driving the container holder 18 by the electric motors 65, the first locking faces 51' and the second locking faces 52' of the locking parts 60 disconnect the connecting rods 50 and the piston rods 32. Due to this, the mass of the pistons 31 and piston rods 32 is separated from the connecting rods 50 and the viscous resistance of the oil of the hydraulic assist cylinders 26 is also no longer felt so what is electrically driven by the electric motors 65 is lightened.

That is, if the gate devices 61 open, the enlarged diameter parts 34 can move freely back and forth inside the hollow parts 35 of the hollow members 33. If doing this, to make the container holder 18 advance and retract in the case where hydraulic power of the hydraulic assist cylinders 26 is not required, it is possible to use just the electric motors 65 and thereby possible to raise the speed and response of movement of the container holder 18. A gate device 61 "opening" means the state where the first locking face 51' and the second locking face 52' retract and the enlarged diameter part 34 can pass through the inside of the hollow part 35, while a gate device 61 "closing" means the state where the first locking face 51' and the second locking face 52' advance to lock the enlarged diameter part 34 and prevent retraction.

A locking part 60 for locking an enlarged diameter part 34 will be explained referring to FIG. 3(*a*) and FIG. 6. The locking part 60 is set in a hollow member 33 fastened to a piston rod 32 of a hydraulic assist cylinder 26. A clearance 36 (FIG. 6) is formed at the cylindrical member 39 etc. so that the locking part 60 can move with respect to the fastened side along with movement of the hollow member 33. The locking part 60 is comprised of a first locking face 51' and second locking face 52', a third bracket 53 to which a cylinder 58 is fastened, a first bracket 51, a second bracket 52, and two tie rods 54 and 55 connecting the third bracket 53 and the first bracket 51. The second bracket 52 is provided with through holes through which tie rods 54 and 55 pass. By driving the cylinder 58, the locking part is operated to open and close with respect to the first bracket 51 while being guided by the tie rods 54 and 55. The first bracket 51 and the second bracket 52 are provided with the first locking face 51' and second locking face 52' locking with the enlarged diameter part 34. An end part of a rod 56 of the cylinder 58 is fastened to the second bracket 52. At the two sides of the third bracket 53, guides 59 are provided. The guides 59 slide along a linear guide 57. The linear guide 57 is fastened to the hollow member 33.

Figure 8:
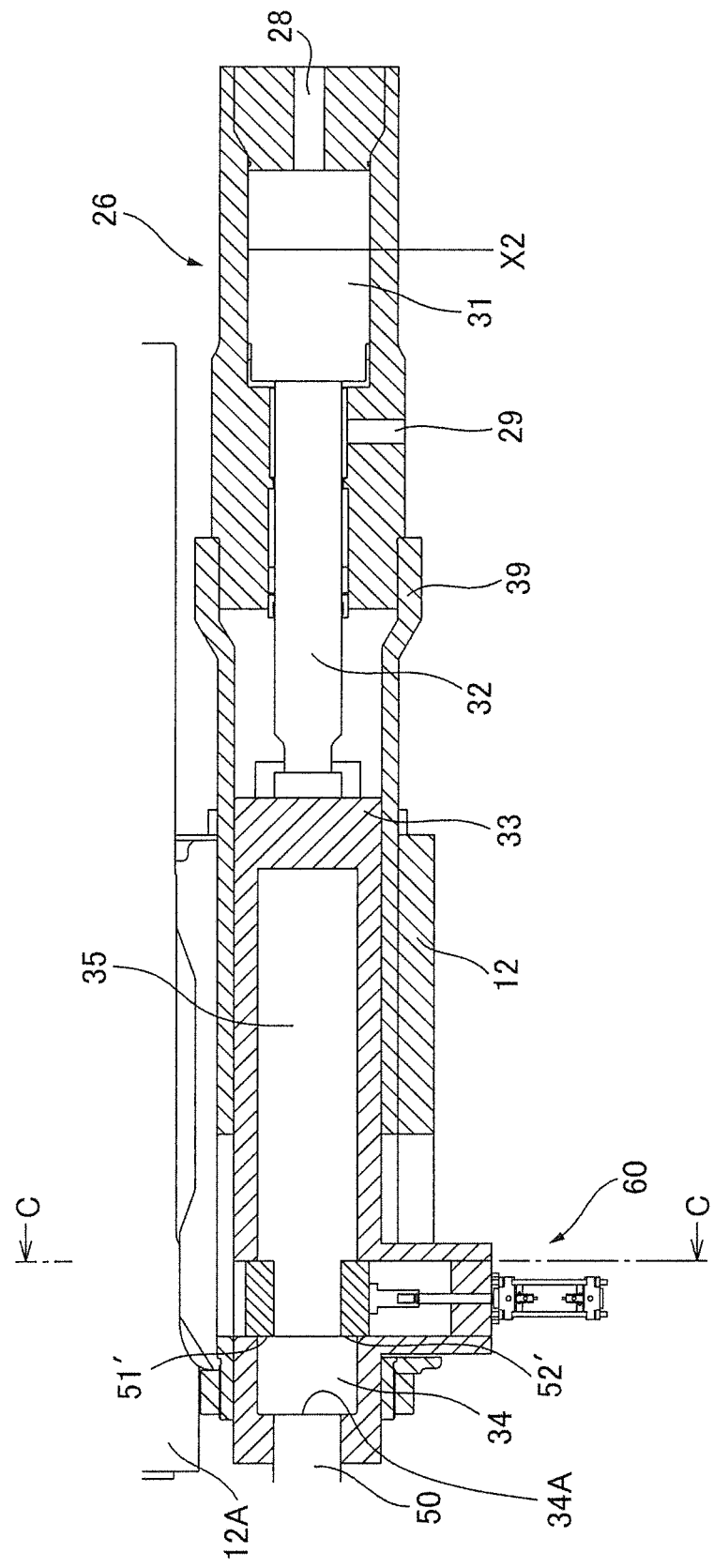
FIG. 8 is an explanatory view for explaining an operating stroke of a gate device of the first embodiment of the present disclosure.
Figure 9:
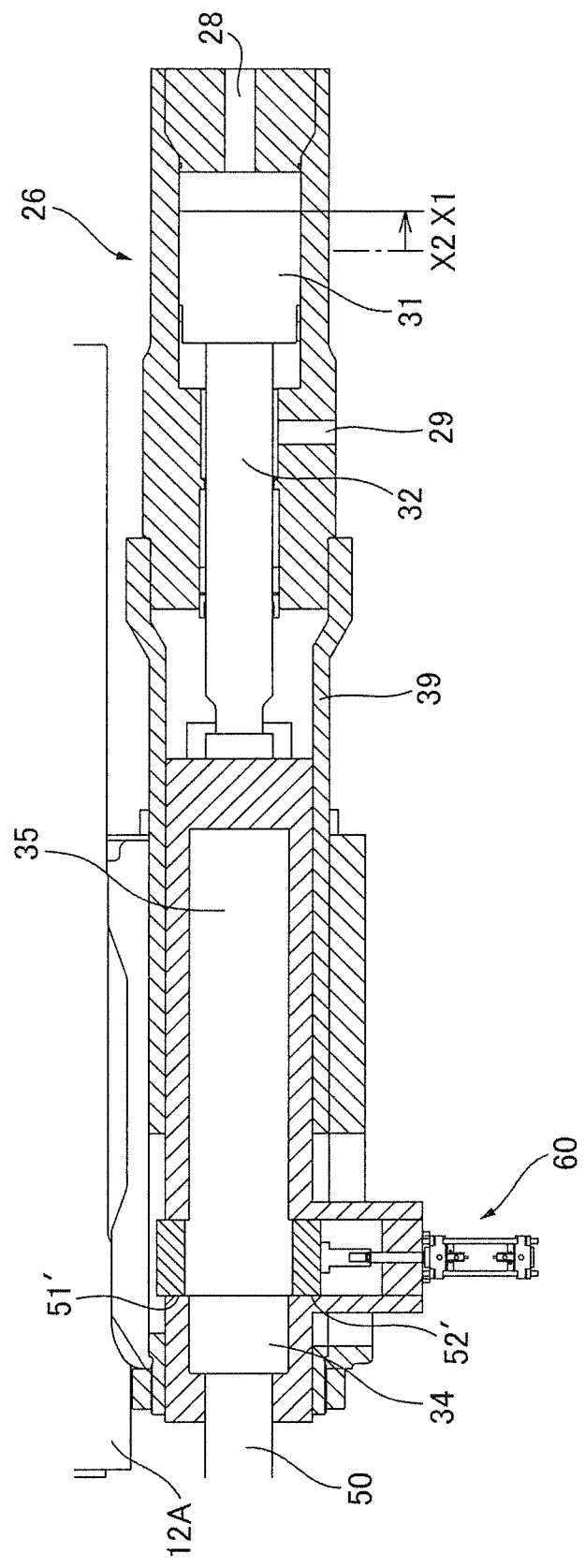
FIG. 9 is an explanatory view for explaining an operating stroke of a gate device of the first embodiment of the present disclosure.

If fluid pressure (air pressure) is applied to the cylinder 58, if the rod 56 pushes up the second bracket 52, due to the reaction force, the first bracket 51, as shown in FIG. 3(*b*), descends downward in the figure whereupon the first bracket 51 and the second bracket 52 are joined. At this time, as shown in FIG. 8, the first locking face 51' and the second locking face 52' lock the enlarged diameter part 34 and connect the connecting rod 50 and the piston rod 32. Note that, for control of the operation, a sensor may be provided for detecting the opening and closing states of the first bracket 51 and the second bracket 52.

In movement of the container holder 18, due to the gate devices 61, hydraulic drive by the hydraulic assist cylinders 26 and electrical drive by the electric motors 65 can be effectively separated. That is, it is possible to connect the hydraulic assist cylinders 26 to the rod 50 to perform a container seal operation and container strip operation while perform operations for making the container holder 18 advance, retract, etc. using only the electric motors 65. Due to this, it is possible to reduce the required outputs of the electric motors 65 and cut the time period of hydraulic drive by the hydraulic assist cylinders 26, so an energy saving effect is obtained.

The extrusion press of the present embodiment is provided with a variable discharge type hydraulic pump (not shown) or variable discharge type hydraulic pump using speed control by an inverter motor and is designed to supply hydraulic pressure through a hydraulic circuit to the opening 11 of the main cylinder 12A and the hydraulic ports 28 and 29 of the hydraulic assist cylinders 26. The opening 11' is an output port of the main cylinder 12A.

After the end of the extrusion process shown in FIG. 4, to cut off and remove the discard, the container is made to retract to secure clearance between the container and die to enable a shear blade to be moved up and down. While not shown in FIG. 1, a discard cutting device is set connected to the end platen 10. As shown in FIG. 5, the end platen 10 is provided with a hole through which a product 20A extruded from the die 16 can pass. Reference numeral 41 shows the remaining part of the billet after extrusion, that is, the discard, which is cut off from the product 20A and recovered. The container 18' in which the billet is loaded is supported by the container holder 18. The discard cutting device is attached to the top part of the container side of the end platen 10 holding the die 16 at its front side.

After the extrusion operation of the billet finishes, the container 18' and the extrusion stem are made to retract to separate the container 18' from the die 16. At the end face of the die 16 at the container side, the remaining part of the billet after extrusion, that is, the discard 41, remains. In this state, the shear blade 42 of the discard cutting device cuts off the discard 41.

Figure 10:
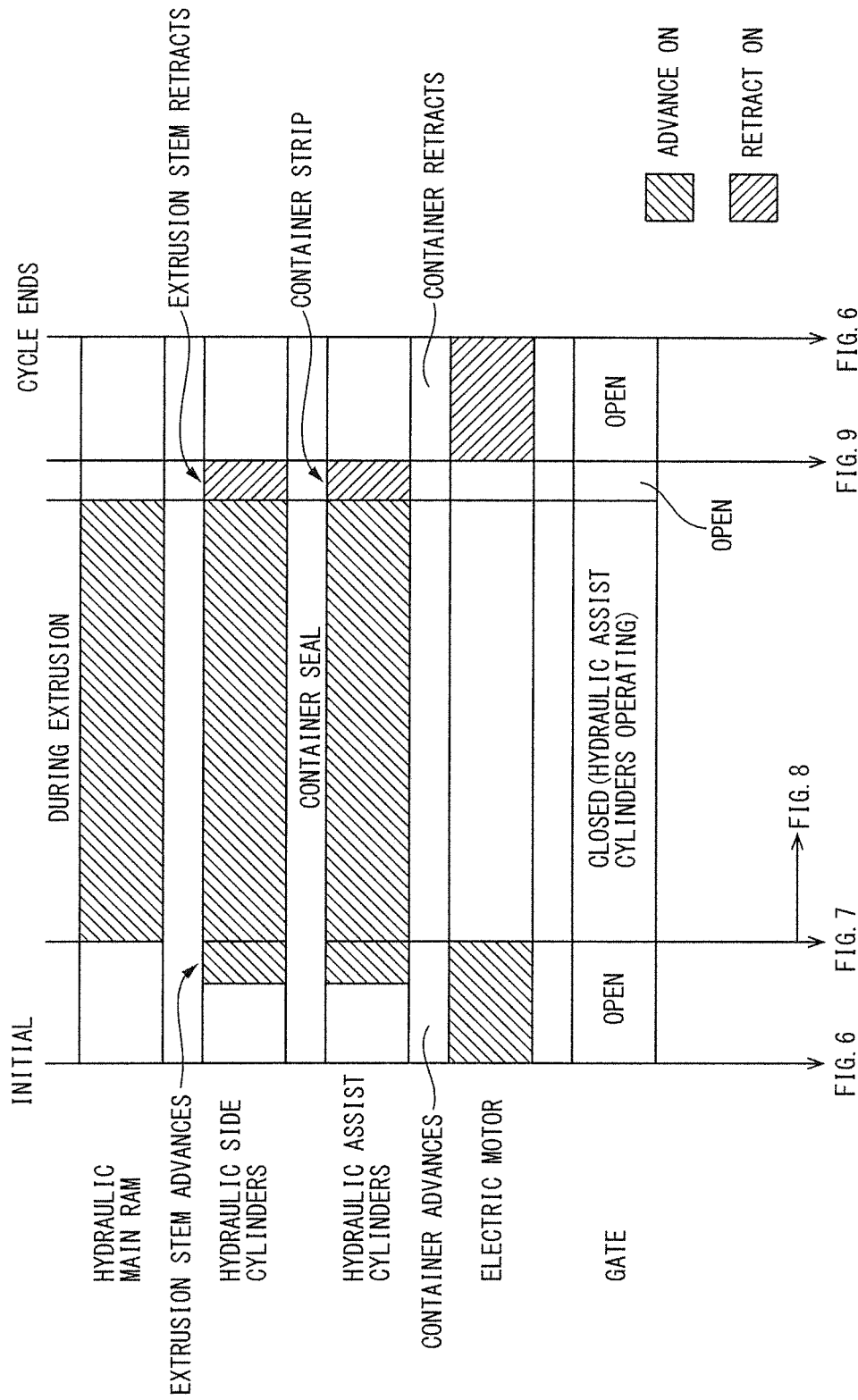
FIG. 10 is a schematic view showing a sequence of hydraulic drive and electrical drive in an embodiment of the present disclosure.

Next, referring to FIGS. 4 to 10, the extrusion process of the present embodiment will be explained. FIG. 10 is a schematic view showing a sequence of hydraulic drive and electrical drive in an embodiment of the present disclosure. The extrusion process of the present embodiment is as follows:

1. Initial Position

At the initial position, the main crosshead 22 and the container holder 18 are at their retraction limits. The enlarged diameter parts 34 of the connecting rods 50, as shown in FIG. 6, are at the retraction limits of Y1 of the hollow parts 35 of the hollow members 33. The pistons 31 of the hydraulic assist cylinders 26 are also at the retraction limits of X1.

2. Advance of Container and Advance of Extrusion Stem

From the state of the initial position shown in FIG. 6, the electric motors 65 are driven to make the container holder 18 advance (make the container advance). At this time, the first locking faces 51' and the second locking faces 52' are in the open state, so the enlarged diameter parts 34 of the rods 50 fastened to the container holder 18 can advance inside the hollow parts 35 without being locked by the first locking faces 51' and the second locking faces 52'. Therefore, the hollow members 33, piston rods 32, and pistons 31 can be lightened in weight and can quickly advance without drag (see FIGS. 1, 6, and 10). Simultaneously, the hydraulic assist cylinders 26 are also driven to advance from the positions of X1 to the positions of X2, so the hollow members 33 reach the advance ends. The drive operation of the hydraulic assist cylinders 26 in this case makes them advance by the amounts of retraction of the hollow members 33 at the time of a container strip operation.

Figure 7:
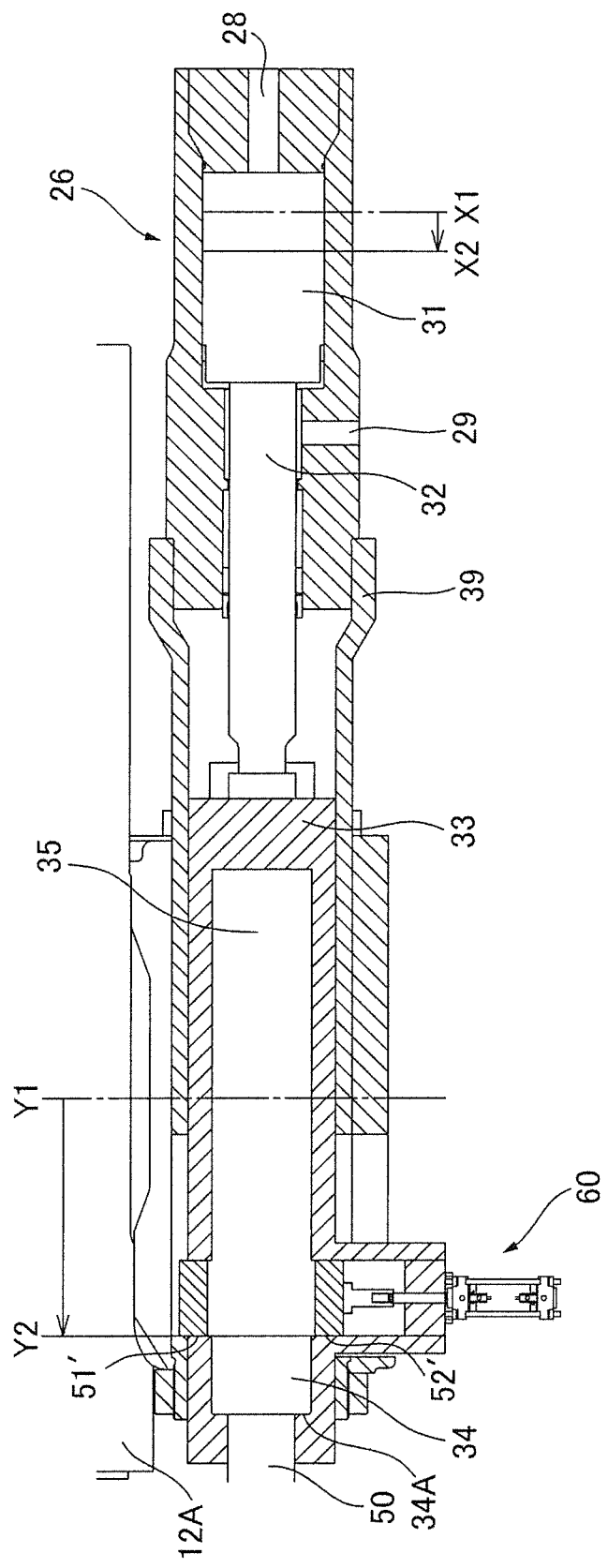
FIG. 7 is an explanatory view for explaining an operating stroke of a gate device of the first embodiment of the present disclosure.

When the hollow members 33 and the container holder 18 reach the advance ends, as shown in FIG. 7, the enlarged diameter parts 34 of the connecting rods 50 shift in state from the positions of Y1 to the positions of Y2. At this time, the container 18', as shown in FIG. 1, advances and contacts the die 16. Before the container advances, the billet is rear loaded from the back side of the container 18'. After the container advances, the side cylinders (not shown) are driven to make the extrusion stem 24 advance and insert the billet into the loading opening 18A of the container 18'. The billet is pressed against the extrusion stem 24 whereby the billet is made to contact the die 16.

3. Container Seal Operation and Start of Extrusion

Next, as shown in FIG. 8, the first locking faces 51' and the second locking faces 52' are made the closed state. Therefore, the enlarged diameter parts 34 of the rods 50 fastened to the container holder 18 are locked by the first locking faces 51' and the second locking faces 52' and the connecting rods 50 and piston rods 32 are connected. Due to this, the hydraulic assist cylinders 26 can press against the container holder 18 and seal the container 18' for a container seal operation. Substantially simultaneously, pressure is applied to the hydraulic main ram 12B connected to the main crosshead 22 whereby the extrusion stem 24 presses against the rear end surface of the billet 20 to start to extrude the product 20A (see FIG. 10).

4. End of Extrusion

As shown in FIG. 4, while leaving the discard 41 of the billet, the pressure on the hydraulic main ram 12B is released and the extrusion process ended.

5. Start of Container Strip Operation

After the extrusion process ends, the container strip operation is started in the state of FIG. 8 and the container holder 18 is made to retract by exactly the amount of the container strip stroke. At this time, the hydraulic assist cylinders 26 are driven to retract. When the hydraulic assist cylinders 26 retract, the front faces 34A of the enlarged diameter parts 34 engage with the front end parts of the hollow parts 35 of the hollow members 33, so the container holder 18 can be made to retract (see FIG. 9). During this time, the first locking faces 51' and the second locking faces 52' are in the open state. The operation of retraction of the container for insertion of a shear device at the end of the container strip operation is performed by the motors 65 since a large force is not required. Once clearance is secured for insertion of the shear device, the shear blade 42 of the discard shear device cuts off the discard 41 (see FIG. 5).

6. Retraction of Container and Retraction of Extrusion Stem

The electric motors 65 of the container holder 18 are driven to make the container holder 18 retract. The first locking faces 51' and the second locking faces 52' are already open and the connections with the hydraulic assist cylinders 26 are broken. Therefore, the movement mass of the container holder 18 is lightened and the drive outputs of the electric motors 65 are kept to the minimum. As shown in FIG. 10, the hydraulic assist cylinders 26 are in no-load states. Meanwhile, the extrusion stem is also retracted. In this way, the state again changes from FIG. 9 to FIG. 6 of the initial position. In the present embodiment, the energy effect is sufficiently exhibited.

As explained above, in the present embodiment, movement of the container holder 18 can be effectively separated by the gate devices 61 into hydraulic drive by the hydraulic assist cylinders 26 and electrical drive by the electric motors 65. That is, it is possible to connect the hydraulic assist cylinders 26 to the rods 50 to perform a container seal operation and container strip operation for removing the discard and to perform operations for making the container holder 18 advance, retract, etc. by high speed movement using only the electric motors 65. Due to this, it is possible to reduce the required outputs of the electric motors 65 and, as seen in FIG. 10, cut the time period of hydraulic drive by the hydraulic assist cylinders 26 (time when hydraulic pumps are operating), so an energy saving effect is obtained.

Usually, retraction of the container and retraction of the main crosshead are performed simultaneously, but the hydraulic cylinders of the container cylinder and side cylinders are connected in series so that rather than dividing the hydraulic fluid, the hydraulic fluid flows in series so that the speed does not fall. For this reason, a shock at the time of startup was unavoidable due to the slow response of the hydraulic circuit, but in the present embodiment, the container is driven by the electric motors while the main crosshead is driven by the hydraulic cylinders, so smooth advance and retraction operations with no startup shock are obtained. Further, it is possible to keep the strokes of the hydraulic assist cylinders to the minimum extent necessary and make them much shorter than the strokes conventionally considered necessary. For this reason, it is possible to reduce factors of uneven loads and extend the lifetimes of packings and other consumables. This is also effective in maintenance. Furthermore, it is possible to separate the hydraulic assist cylinders by opening the gate devices, so it is possible to increase the stroke of the container holder by electrical drive for maintenance and inspection without regard as to the strokes of the hydraulic assist cylinders.

By using a drive source of a mixture of a hydraulic device type and electrical drive type, it is possible to conserve energy. It is possible to improve maintenance and cut the maintenance time so as to improve the operating rate of the equipment and realize a higher productivity facility. Simultaneously, the locations where hydraulic units are used can be cut, so the risk of oil leakage is reduced, the work environment can be improved, and the machinery and equipment can be made better in operability.

Second Embodiment

Figure 11:
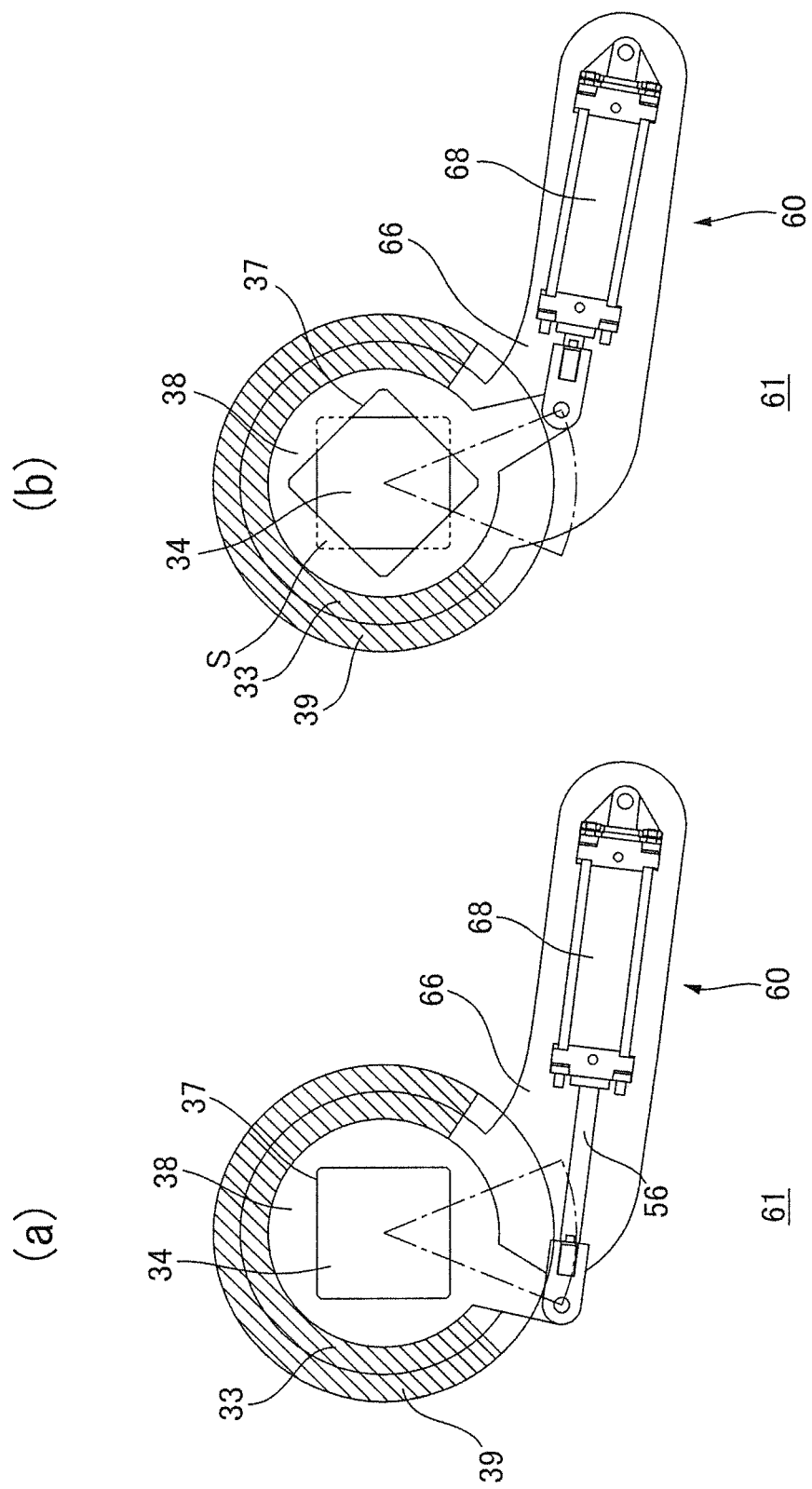
FIGS. 11(*a*) and (*b*) are cross-sectional views of a gate device along the line D-D of FIG. 12 in a second embodiment of the present disclosure, in which (a) is a locking part in a state not locking an enlarged diameter part and (b) is a locking part in a state locking an enlarged diameter part.
Figure 12:
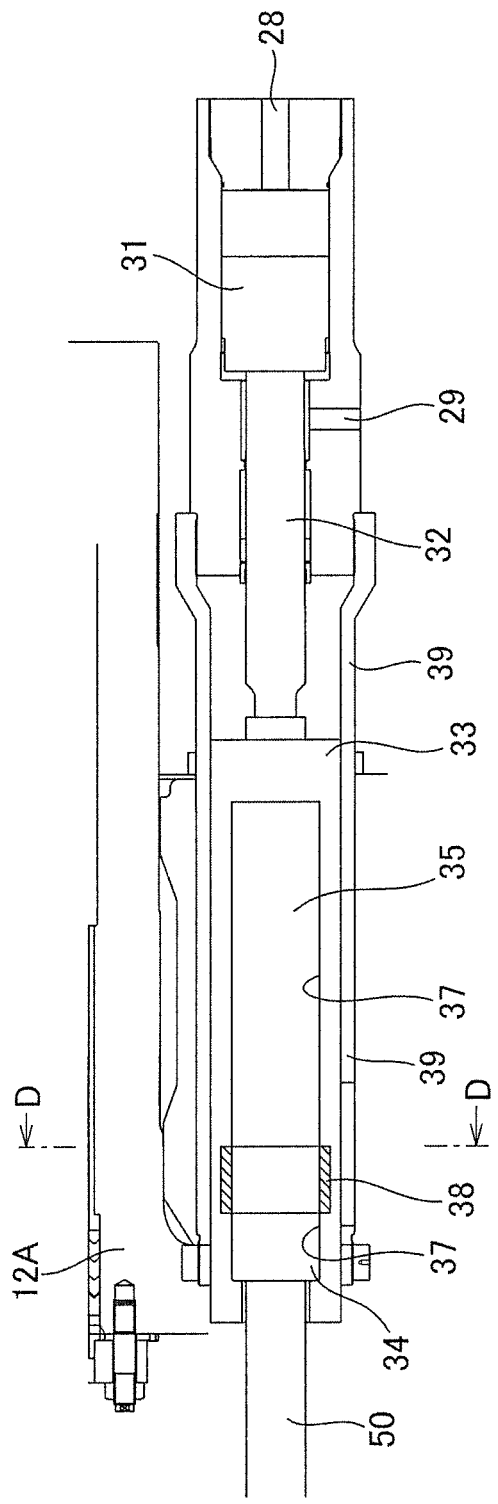
FIG. 12 is an explanatory view explaining the operations of a gate device and hydraulic assist cylinder of the second embodiment of the present disclosure.

FIGS. 11(a) and (b) are cross-sectional views of a gate device along the line D-D of FIG. 12 in a second embodiment of the present disclosure, in which (a) is a view showing a state where a locking part has not locked an enlarged diameter part and (b) is a view showing the state where a locking part has locked an enlarged diameter part. FIG. 12 is an explanatory view for explaining the operations of a gate device and a hydraulic assist cylinder of the second embodiment of the present disclosure.

The second embodiment differs in the mechanism of the locking part 60 locking the enlarged diameter part 34 from the first embodiment, as seen in FIGS. 11(a) and (b). The rest of the constitution is similar to the first embodiment. The cross-sectional shape of the enlarged diameter part 34 is a predetermined shape such as a square shape. The locking part 60 is comprised of a cylinder 68 and a locking plate 38 having a locking plate through hole 37 of the same shape as the cross-sectional shape of the enlarged diameter part. The cylinder 68 is used to make the locking plate 38 rotate about the axial center of the connecting rod 50 to lock the enlarged diameter part 34. In the first embodiment, the cross-sectional shape of the enlarged diameter part 34 was basically a circular shape, but in the second embodiment, it is a square shape. The cross-sectional shape of the enlarged diameter part 34 may be any predetermined shape other than a circular shape, that is, the cross-sectional shape of the enlarged diameter part 34 may be a triangular shape or other polygonal shape, an oval, etc. The point is that the locking plate through hole 37 be of a shape so that if made to turn about the axis of the connecting rod 50, the not turning enlarged diameter part 34 will be locked. The connecting rod 50 is fastened to the container holder 18, so does not rotate about the axial center. The cross-sectional shape of the inner circumferential surface 37 of the hollow part 35 is a square shape. Note that the hollow part 35 at the front side of the locking plate 38 is the same shape as the cross-sectional shape of the enlarged diameter part 34. In the present embodiment, the hollow part 35 at the back side of the locking plate 38 is also a square shaped cross-section, but it need only be a shape with an inside diameter through which the enlarged diameter part can pass.

In the present embodiment, a cylinder 68 is set at the bracket 66 fastened to the hollow member 33. The front end of the rod 56 of the cylinder 68 is attached to be able to pivot at part of the locking plate 38. The locking plate 38 is provided with a square shape locking plate through hole 37 and has a shape the same as the cross-sectional shape of the enlarged diameter part 34. For this reason, as shown in FIG. 11(a), if the locking plate through hole 37 and the enlarged diameter part 34 match in cross-sectional shapes, the enlarged diameter part 34 freely moves back and forth through the hollow part 35. If making the rod 56 of the cylinder 68 extend, as seen in FIG. 11(a), the locking plate through hole 37 and the enlarged diameter part 34 match in cross-sectional shape. Therefore, at this time, the enlarged diameter part 34 can pass through the hollow part 35. Due to this, the mass of the piston 31 and piston rod 32 is separated from the connecting rod 50 and the viscous resistance of the oil of the hydraulic assist cylinder 26 is no longer felt as well so what is electrically driven by an electric motor 65 is lightened On the other hand, if making the rod 56 of the cylinder 68 retract, the locking plate 38 rotates about 45° whereby, as shown in FIG. 11(b), a surface S is formed abutting with the corner of the square shaped enlarged diameter part 34 at a position of a side of the locking plate through hole 37. Due to this, in the case of FIG. 11(b), in the same way as the first locking face 51' and the second locking face 52' of the first embodiment, the enlarged diameter part 34 is locked and the connecting rod 50 and the piston rod 32 are connected. That is, the hydraulic assist cylinder 26 is connected to the rod 50 to perform a container seal operation and a container strip operation for removing the discard.

In the present embodiment as well, the hydraulic assist cylinders 26 are connected to the rods 50 to perform a container seal operation and a container strip operation for removing the discard, while the operations for making the container holder 18 advance and retract etc. can be performed at a high speed by just the electric motors 65. The rest of the actions and effects are the same as those of the first embodiment.

Third Embodiment

Figure 13:
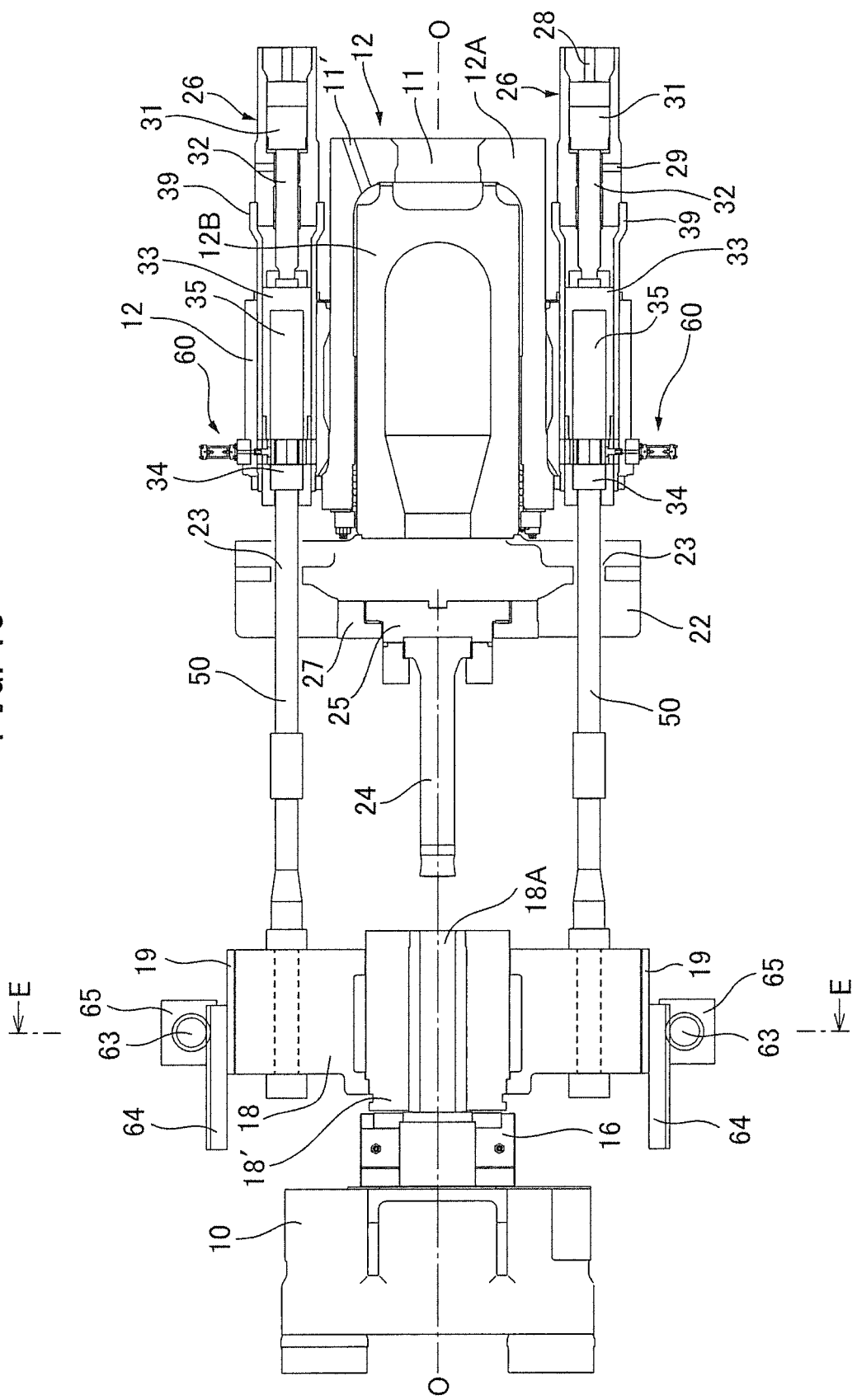
FIG. 13 is a plan view showing a third embodiment of the present disclosure.
Figure 14:
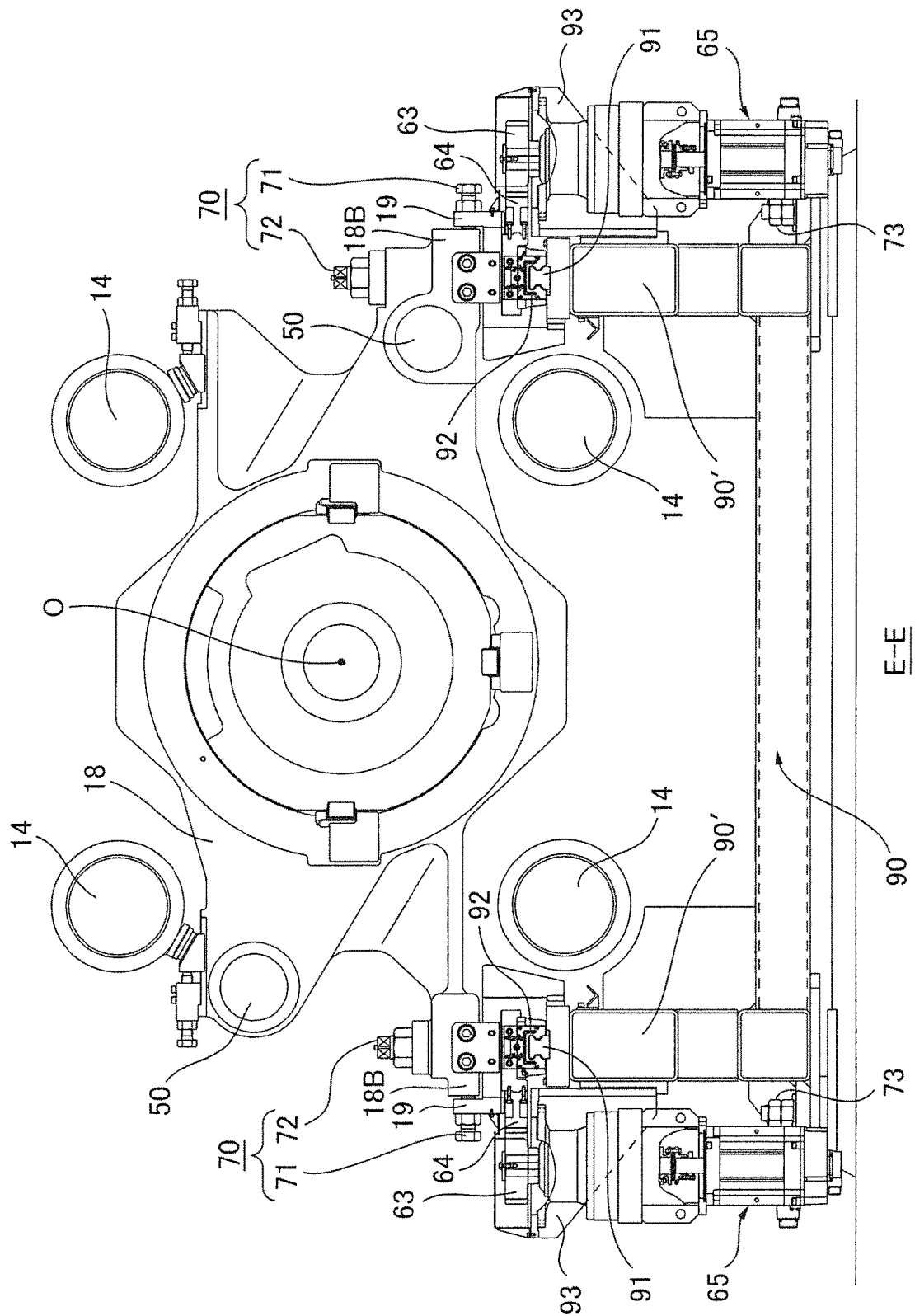
FIG. 14 is a cross-sectional view along the line E-E of FIG. 13.

FIG. 13 is a plan view showing a third embodiment of the present disclosure. FIG. 14 is a cross-sectional view along the line E-E of FIG. 13. The third embodiment is an embodiment different from the first embodiment in the positions of attachment of the electric motors 65 for moving the container holder 18.

In the first embodiment, the electric motors 65 for driving the container holder 18 to advance or retract were attached to the container holder 18, but in the third embodiment, they do not move together with the container holder 18 but are attached to the machine base 90 side in a stationary manner. The machine base 90 is attached to the foundation by anchor nuts 73. The electric motors 65 are attached to top beams 90' of the machine base 90 through brackets 93. The output shafts of the electric motors 65 have gears 63 attached to them. The racks 64 engaging with the gears 63 are fastened to the container holder support table 19 as shown in FIGS. 13 and 14. The container holder support table 19 has sliders 92 attached to its bottom surface. The sliders 92 are carried on rails 91 set on the machine base 90. On the container holder support table 19, the container holder 18 is carried so as to be able to be positioned in the horizontal and vertical direction through later explained center adjusting mechanisms 70. If the electric motors fastened to the machine base 90 drive the gears 63 (pinions) to rotate, the container holder 18 moves on the rails 91 along the axial center O in a sliding manner through the racks 64 fastened to the container holder side.

The container holder 18 is provided with center adjusting mechanisms 70 at least at four locations of the container holder support table 19 to the left and right and front and back in FIG. 14. The center adjusting mechanisms 70 are respectively comprised of horizontal direction adjustment screws 71 and vertical direction adjustment screws 72. The horizontal direction adjustment screws 71 are screwed into the container holder support table 19. Their front ends press against the side end parts 18B of the container holder 18. Similarly, the vertical direction adjustment screws 72 are screwed into the side end parts 18B. Their front ends press against the top surface of the container holder support table 19. Due to these screws, the billet loading opening 18A of the container 18' and the extrusion stem 24 of the main crosshead 22 are adjusted to be arranged coaxially (axial center O). As seen in FIG. 14, the electric motors 65 are set below the adjustment screws 71, so unlike the first embodiment, the adjustment screws 71 are not affected by the positions of placement of the electric motors 65 and can be set at any positions of the container holder 18. As explained above, the third embodiment has the hydraulic assist cylinders 26, gate devices 61, etc. and is the same in constitution and action and effect as the first embodiment except for the point that the electric motors 65 are attached to the machine base 90 side.

In the third embodiment, in addition to the effect of the first embodiment, the following effects are obtained.

(1) Since the electric motors 65 are fastened to the machine base 90 far from the container 18', there is no effect due to heat from the heated container 18' and therefore no rise in temperature of the electric motors 65, so the electric motors 65 are not affected by the heating.

(2) The positions of placement of the center adjusting mechanisms 70 of the container holder 18 are not affected by the placement of the electric motors 65. For this reason, the container holder 18 does not become unnecessarily longer in order to secure the positions for placement of the electric motors 65 or center adjusting mechanisms 70 and the billet length can be set based on the suitable length of the container holder 18.

(3) Since the electric motors 65 are fastened to the machine base 90 side, the container 18' is not affected by vibration due to operation of the electric motors 65 and a stable extrusion performance is obtained.

(4) The electric motors 65 are fastened in a stationary manner to the machine base 90. Further, the motor transmission mechanisms may be made simple in structure, so motor replacement and maintenance are easy.

Note that the present disclosure is not limited in technical scope to the above-mentioned embodiments. It includes various changes made to the above embodiments within a scope not deviating from the gist of the present disclosure. That is, the specific constitutions explained in the embodiments are just examples and can be suitably changed.

REFERENCE SIGNS LIST 10. end platen
12. main cylinder housing
12A. main cylinder
18. container holder
22. main crosshead
24. extrusion stem
26. hydraulic assist cylinder
32. piston rod
33. hollow member
34. enlarged diameter part
35. hollow part
50. connecting rod
61. gate device
65. electric motor
90. machine base

The invention claimed is:

1. A hybrid extrusion press comprising:
a machine base,
an end platen having a die,
a main crosshead having an extrusion stem and sliding on the machine base,
a hydraulic main ram coupled with the main crosshead,
a container holder sliding on the machine base,
electric motors and hydraulic assist cylinders that cause the container holder to slide, and
connecting rods fastened to the container holder, wherein
the hydraulic assist cylinders have piston rods and gate devices connecting or disconnecting the connecting rods and the piston rods, and
the gate devices are provided with hollow members fastened to the piston rods, enlarged diameter parts provided at single ends of the connecting rods and moving back and forth inside hollow parts of the hollow members, and locking parts provided at the hollow members and locking the enlarged diameter parts.

2. The hybrid extrusion press according to claim 1, wherein
each locking part comprises a cylinder, a first bracket, a third bracket to which the cylinder is fastened, tie rods connecting the third bracket and first bracket, and a second bracket guided by the tie rods and sliding by the cylinder, and
when the first bracket and the second bracket are in a closed position, the first bracket and the second bracket lock a rear end surface of the enlarged diameter part.

3. The hybrid extrusion press according to claim 1, wherein
each enlarged diameter part has a cross-sectional shape of a predetermined shape including a square shape,
each locking part comprises a cylinder and a locking plate having a locking plate through hole of the same shape as the cross-sectional shape of the enlarged diameter part, and
the cylinder causes the locking plate to rotate about an axis of the connecting rod to lock the enlarged diameter part.

4. The hybrid extrusion press according to claim 1, wherein
when the gate devices connect the connecting rods and the piston rods, a container seal operation and a container strip operation are performed by the hydraulic assist cylinders, and
when the gate devices disconnect the connecting rods and the piston rods, operations for making the container holder advance and retract are performed by the electric motors.

5. The hybrid extrusion press according to claim 1, wherein the electric motors are fastened to the machine base.

* * * * *